United States Patent [19]

Dubois

[11] 4,012,862
[45] Mar. 22, 1977

[54] ARTIFICIAL FISHING LURE AND SPINNER

[76] Inventor: Eugene Dubois, 1057 Sunshine, Baker, La. 70714

[22] Filed: Apr. 14, 1975

[21] Appl. No.: 567,526

[52] U.S. Cl. .......................... 43/42.06; 43/42.11; 43/42.42; 43/42.49
[51] Int. Cl.[2] .................................. A01K 85/00
[58] Field of Search .......... 43/42.06, 42.11, 42.13, 43/42.19, 42.4, 42.42, 42.49

[56] References Cited
UNITED STATES PATENTS 1,996,477  4/1935  Lauby .................................. 43/42.19
3,257,750  6/1966  Shannon ........................... 43/42.06

*Primary Examiner*—Louis G. Mancene
*Assistant Examiner*—Daniel J. Leach
*Attorney, Agent, or Firm*—Roy, Kiesel, Patterson, Hudson & Abadie

[57] ABSTRACT

An artificial fishing lure comprising a body means having a hook rigidly attached thereto with a one piece spinner wire and weed guard construction, and a floatable spinner which may be scented also attached to the body means.

8 Claims, 7 Drawing Figures

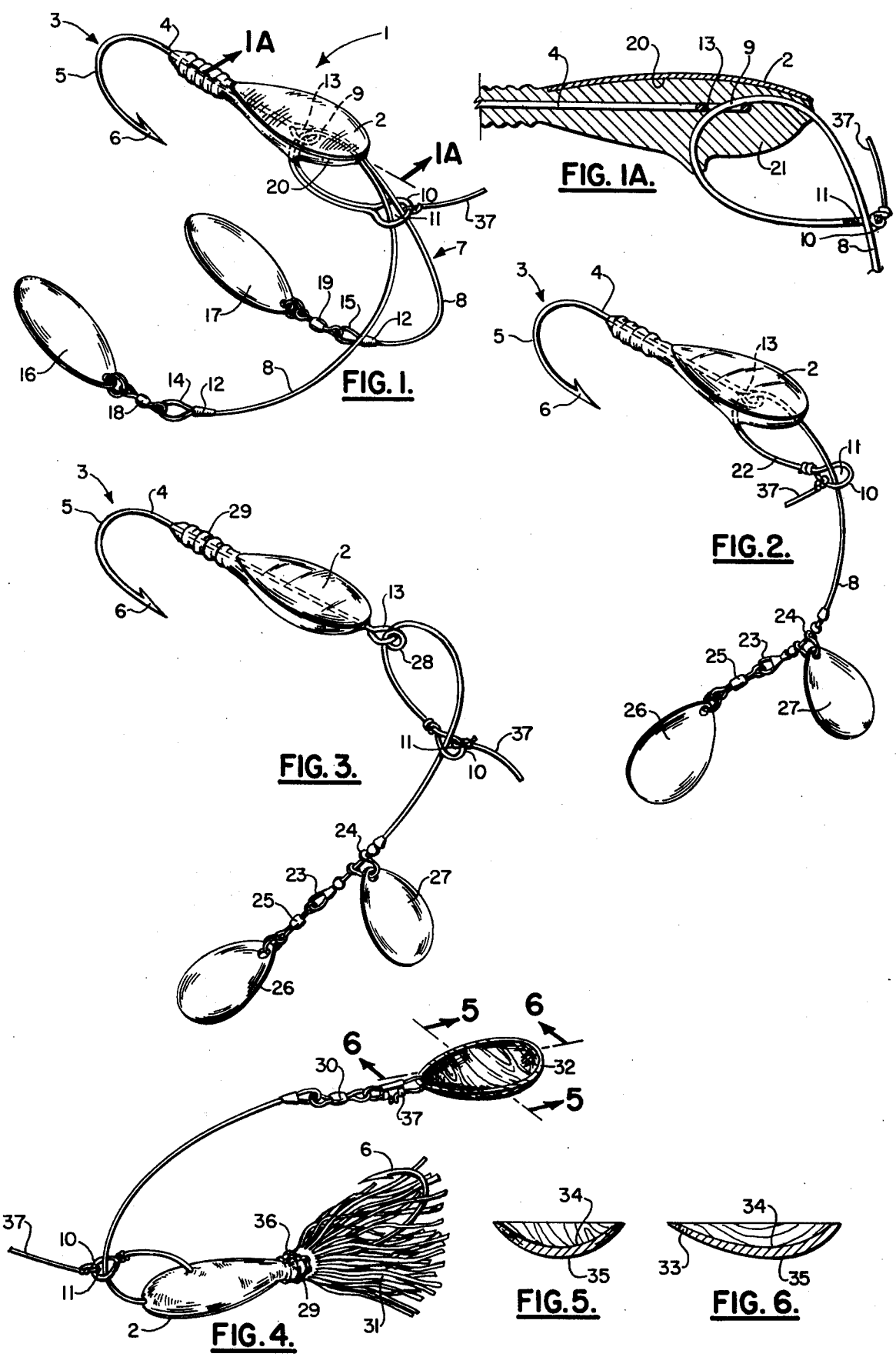

ARTIFICIAL FISHING LURE AND SPINNER

BACKGROUND OF THE INVENTION

1. Field of the Invention

This invention relates to artificial fishing lures and more particularly to an artificial fishing lure having a one piece spinner wire and weed guard, and also to a special spinner construction.

2. Prior Art

One persistent problem in artificial fishing lures is the development of a lure that effectively prevents the hook from getting caught by weeds or other submerged objects while still maintaining proper action to attract fish. Examples of present day lures are illustrated in U.S. Shannon Pat. No. 1,295,617 entitled "Fish Lure," U.S. Grube Pat. No. 1,591,704 entitled "Artificial Bait," U.S. Taylor Pat. No. 1,654,830 entitled "Artificial Bait for Fish," U.S. Shannon Pat. No. 1,734,883 entitled "Fish Lure," U.S. Lang Pat. No. 1,840,273 entitled "Fishing Lure," U.S. Johnson Pat. No. 2,017,903 entitled "Artificial Fishing Bait," U.S. Fairfax Pat. No. 2,294,082 entitled "Fish Lure," U.S. Weigandt Pat. No. 2,682,128 entitled "Artificial Fish Lure for Surface and Underwater Fishing," U.S. Woolums Pat. No. 3,546,804 entitled "Fishing Lures."

Because most artificial fishing lures and particularly spinner lures, are presently constructed by manual labor it is important that any lure be easily and quickly constructed.

Another desire of the industry is to provide a lure that will provide motion in water that will attract fish.

Still another problem in the industry has been the failure to scent spinning lures whereby the scent will remain after repeated use.

SUMMARY OF THE INVENTION

It is an object of this invention to provide an artificial fishing lure that prevents the lure's barbed hook from getting caught on submerged objects while still maintaining proper action to attract fish.

Another object of this invention is to provide an artificial fishing lure that can be easily and quickly assembled.

A further object is to provide a lure that provides a motion in water that will attract fish.

Still another object of this invention is to provide a scented fishing lure that is capable of maintaining its scent after repeated use.

These and other objects and advantages of this invention will become apparent from the ensuing descriptions of the invention.

Accordingly, an artificial fishing lure is disclosed having a body to which at one end is attached the shank of a barbed hook wherein the hook's point is directed back toward the body and to the opposite end is attached a one piece guard means having a guide loop and having at least one spinner connecting wire passing through the guide loop with a pivotable spinner attached to the end of the connecting wire.

In another embodiment of this invention an artificial fishing lure is provided having a floatable spinner which may be scented if desired.

BRIEF DESCRIPTION OF THE DRAWINGS

FIG. 1 is a perspective or cutaway view of one embodiment of a double spinner leader bait in accordance with this invention.

FIG. 1A is a cross-sectional view taken along lines 1A — 1A of FIG. 1.

FIG. 2 is a perspective view of a one piece guard arrangement having a single leader wire in accordance with this invention.

FIG. 3 is a perspective view of another embodiment of this invention wherein the one-piece guard means is swivelably connected to the lure's body section.

FIG. 4 is a perspective view of a standard skirted artificial lure using a floatable spinner in its trolling position.

FIG. 5 is a cross-sectional view taken along lines 5 — 5 of FIG. 4.

FIG. 6 is a cross-sectional view taken along lines 6 — 6 of FIG. 4.

PREFERRED EMBODIMENTS OF THE INVENTION

Referring now to FIG. 1, and 1A, the artificial fishing lure 1 has a body means 2, a hook means 3 with a shank section 4 attached to body means 2 and a bend section 5 leading from shank section 4 to barbed point section 6, and a guard means 7 having a spinner wire section 8, connecting section 9 and a loop section 10.

The lure is constructed by shaping loop section 10 of guard means 7 by bending a single strand of wire to form loop opening 11. The wire will provide the correct amount of rigidity for protecting barbed point section 6 from getting caught in underwater weeds. Next, spinner wire ends 12 are passed through hook eyelet 13 and bent to form loops 14 and 15, to which connect spinners 16 and 17, respectively in a standard fashion, such as, though the use of swivel connection means 18 and 19, respectively. Hook means 3 is then placed in position by pouring molten lead 21 on surface 20 until it covers hook eyelet 13. When the molten lead cools and hardens, guide means 7 will be securely attached to body means 2. Finally, spinner wire sections 8 are bent to be below and on either side of barbed point section 6.

Fishing line 37 is attached to loop section 10.

If desired, a single spinner wire arrangement can be used as illustrated in FIG. 2. In this arrangement, loop section 10 is constructed by bending wire 22 into a loop and twisting it about itself as shown. The other end 23 of wire 22 is passed through hook eyelet 13 and, as before, through loop opening 11. Connected by conventional means such as swivel connection means 24 and 25, to wire end 23 are two spinners 26 and 27.

If greater action is desired by the lure in the water, then a pivoting connection such as illustrated in FIG. 3 can be used. In this embodiment hook eyelet 13 extends beyond body means 2. Spinner wire 8 is then passed through eyelet 13 at least once to form a pivot loop 28 about which spinner wire 8 can pivot. As before, spinners 26 and 27, will be connected to wire end 23 in a conventional manner, such as by swivel connection means 24 and 25, respectively.

In an alternate embodiment of this invention, the artificial lure 1 will be provided with floatable spinners 32 which may be impregnated with a scent such as an anisette as well as other scents that fish are known to be attracted to.

Referring now to FIGS. 4 through 6, the body 2 of an artificial lure is provided with a spinner leader assembly such as previously described to which spinner 32 is connected by a swivel means 30 that allows spinner 32 to twist about the spinner wire section 8. Lure skirt 31 is attached to body 2 by means of an elastic band 36 attached to ribbed tail area 29. The skirt is designed to partially camouflage and hide the hood barb 6.

The spinner 32 may be constructed of wood, foam, certain plastics and other materials which have the capabilities of floating in water, and which have the capability of being impregnated with a scented oil.

In a preferred embodiment, the spinner 32 will have a concave surface 34 and a convex surface 35 which will provide greater spinning action when the lure is moving in the water. Spinner 32 is connected to swivel means 30 by passing a swivel wire 37 through spinner opening 33.

It has been found that the floating spinner will assist in keeping swivel means 30 as well as the spinner itself from becoming fouled about hook barb 6 when the lure has been cast into the water. Furthermore, it has been found that the floating spinner increases the action of the artificial lure particularly when the lure is not being reeled in. Still a further advantage of the floating spinner is that it allows a slower retrieval of the fishing lure thus providing more time for the fish to observe and strike the lure, as well as reducing the wear and tear on the fishing reel.

In still another preferred feature, the lure body 2 can be designed to have a weight small enough that the floatable spinner will be capable of suspending the lure below the surface of the water.

In the case of a spinner constructed from wood, a scent may be applied by soaking the spinner into a scented oil which will impregnate the wooden fibers. Once impregnated, the scented oil will not be rubbed off during use, thus allowing the lure to maintain its scent for extended periods of time.

In another preferred feature, the spinner can also be impregnated with a dye which will add color that is known to attract fish, yet, which will not chip or flake off with repeated use as with present day baits.

There are, of course, many alternate ways to construct the lines as disclosed, and these obvious alternatives are included in this description of the invention.

Having described my invention, what I claim as new, novel, useful and non-obvious, and desire United States Letters Patents, is:

1. An artificial fishing lure which comprises:
   a. a body means;
   b. a hook means having a shank section, bend section and barbed point section, said shank section attached to one end of said body means whereby said barbed point section is directed back toward said body means; and
   c. a guard means constructed from a single metal wire and having a spinner wire section, a loop section and a connecting section attached to said body means wherein said spinner wire section passes through said loop section and curves back toward said barbed point section.

2. An artificial fishing lure in accordance with claim 1 wherein said guard means is constructed from guage steel wire.

3. An artificial fishing lure in accordance with claim 1, wherein said spinner wire section comprises a pivot loop attached to a hook eyelet of said hook means in a pivotable fashion.

4. An artificial fishing lure in accordance with claim 1 wherein a spinner is attached to said spinner wire section.

5. An artificial underwater spinner fishing lure which comprises:
   a. a body means;
   b. a hook means having a shank section, a bend section, and a barbed point section, said shank section attached to one end of said body means whereby said barbed point section is directed back toward said body means; and
   c. a leader assembly attached at one end to said body means, and attached to said leader assembly's other end is a spinner constructed of material floatable in water.

6. An artificial fishing lure according to claim 5 wherein said floatable spinner has a concave surface and a convex surface.

7. An artificial underwater spinner fishing lure which comprises:
   a. a body means;
   b. a hook means having a shank section, a bend section, and a barbed point section, said shank section attached to one end of said body means whereby said barbed point section is directed back toward said body means; and
   c. a leader assembly attached at one end to said body means and attached to said leader assembly's other end is a spinner constructed of material floatable in water, said spinner being constructed of material impregnated with a scented oil.

8. An artificial underwater spinner fishing lure according to claim 5 wherein said body means has a weight small enough that said spinner will have enough buoyancy to suspend said lure below said water.

* * * * *